(12) United States Patent
Tarui et al.

(10) Patent No.: US 11,314,221 B2
(45) Date of Patent: Apr. 26, 2022

(54) MACHINE TOOL AND MANAGEMENT SYSTEM

(71) Applicant: FANUC CORPORATION, Yamanashi (JP)

(72) Inventors: Yoshihiko Tarui, Yamanashi (JP); Yoshinori Hoshino, Yamanashi (JP); Yasuaki Koyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 202 days.

(21) Appl. No.: 16/779,878

(22) Filed: Feb. 3, 2020

(65) Prior Publication Data

US 2020/0310381 A1    Oct. 1, 2020

(30) Foreign Application Priority Data

Mar. 25, 2019   (JP) .............................. JP2019-056920

(51) Int. Cl.
*G05B 19/406*    (2006.01)
*G05B 19/408*    (2006.01)
(Continued)

(52) U.S. Cl.
CPC ......... *G05B 19/406* (2013.01); *G05B 19/408* (2013.01); *G05B 19/40938* (2013.01);
(Continued)

(58) Field of Classification Search
CPC ................ G05B 19/406; G05B 19/408; G05B 19/40938; G05B 2219/35453;
(Continued)

(56) References Cited

U.S. PATENT DOCUMENTS

| 5,577,164 A | 11/1996 | Kaneko et al. |
| 5,991,726 A * | 11/1999 | Immarco ................. G10L 15/22 |
| | | 704/E15.04 |

(Continued)

FOREIGN PATENT DOCUMENTS

| JP | H06-95831 A | 4/1994 |
| JP | H07-219591 A | 8/1995 |

(Continued)

OTHER PUBLICATIONS

Japanese Office Action dated Jul. 6, 2021, in connection with corresponding JP Application No. 2019-056920 (7pp., including machine-generated English translation).

Japanese Search Report dated Jun. 30, 2021, in connection with corresponding JP Application No. 2019-056920 (22pp., including machine-generated English translation).

*Primary Examiner* — Hien D Khuu
(74) *Attorney, Agent, or Firm* — Maier & Maier, PLLC (57) ABSTRACT

A machine tool includes a speech input unit that accepts speech from an operator as input, a speech recognition unit that recognizes the speech input into the speech input unit, a status determination unit that determines an operating status of the machine tool when the speech is input into the speech input unit, a display unit, a storage unit that stores a plurality of screens, and a screen selection unit that selects a screen according to a combination of the speech recognized by the speech recognition unit and the operating status of the machine tool determined by the status determination unit from among the plurality of screens, and causes the display unit to display the selected screen.

11 Claims, 4 Drawing Sheets

(51) Int. Cl.
  *G06N 20/00* (2019.01)
  *G06F 3/16* (2006.01)
  *G10L 15/08* (2006.01)
  *G05B 19/4093* (2006.01)
(52) U.S. Cl.
  CPC .............. *G06F 3/16* (2013.01); *G06N 20/00* (2019.01); *G10L 15/08* (2013.01)
(58) Field of Classification Search
  CPC .............. G05B 19/409; G05B 19/4155; G05B 2219/32026; G06F 3/16; G06F 3/167; G06N 20/00; G10L 15/08
  USPC ......................................................... 700/90
  See application file for complete search history.

(56) References Cited

U.S. PATENT DOCUMENTS

2017/0060356 A1    3/2017  Oota et al.
2018/0333846 A1*  11/2018  Tarui ........................ B25J 9/161

FOREIGN PATENT DOCUMENTS

| JP | 2001-175320    | * | 6/2001 |
| JP | WO 2001/056016 | * | 8/2001 |
| JP | 2006-068865 A  |   | 3/2006 |
| JP | 2011-002656 A  |   | 1/2011 |
| JP | 2011-222046 A  |   | 11/2011 |
| JP | 2017-045323 A  |   | 3/2017 |
| JP | 2020-123905 A  |   | 8/2020 |

* cited by examiner

| | OPERATING STATUS OF MACHINE TOOL | SPEECH | SCREEN |
|---|---|---|---|
| 1ST EXAMPLE | PROGRAM STOPPED DURING RIGID TAPPING | "RETURN SCREEN" | RIGID TAP RETURN |
| 2ND EXAMPLE | PROGRAM STOPPED DURING AUTOMATIC TOOL EXCHANGE | "RETURN SCREEN" | TURRET RETURN |
| 3RD EXAMPLE | NO RETURN TO X AXIS ORIGIN | "ORIGIN RETURN SCREEN" | X AXIS ORIGIN RETURN |
| 4TH EXAMPLE | NO RETURN TO Y AXIS ORIGIN | "ORIGIN RETURN SCREEN" | Y AXIS ORIGIN RETURN |
| 5TH EXAMPLE | LADDER PROGRAM ADDRESS NOT SET | "SETUP SCREEN" | EXTERNAL INTERFACE |
| 6TH EXAMPLE | ADDITIONAL AXIS TABLE PARAMETER NOT SET | "ADDITIONAL AXIS SCREEN" | EDIT ADDITIONAL AXIS PARAMETERS |
| 7TH EXAMPLE | NETWORK-RELATED ALARM OCCURRED AFTER NETWORK SETUP | "I WANT TO CANCEL THE ALARM" | NETWORK SETUP |
| 8TH EXAMPLE | JIG CONTROLLED BY DO SIGNAL FROM ROBOT | "I WANT TO OPERATE THE JIG" | DIGITAL OUTPUT |

MACHINE TOOL AND MANAGEMENT SYSTEM

CROSS-REFERENCE TO RELATED APPLICATIONS

This application claims the benefit of Japanese Patent Application No. 2019-056920, the content of which is incorporated herein by reference.

FIELD

The present invention relates to a machine tool and a management system.

BACKGROUND

In the related art, an operator's panel for an industrial robot that recognizes the operator's speech and displays a screen selected on the basis of the speech is known (for example, Japanese Unexamined Patent Application, Publication No. 2006-068865).

Also, a technology that improves the accuracy of speech recognition by learning has been proposed (for example, Japanese Unexamined Patent Application, Publication No. Hei 07-219591 and Japanese Unexamined Patent Application, Publication No. 2011-002656).

SUMMARY

One aspect of the present disclosure is a machine tool including a speech input unit that accepts speech from an operator as input, a speech recognition unit that recognizes the speech input into the speech input unit, a status determination unit that determines an operating status of the machine tool when the speech is input into the speech input unit, a display unit, a storage unit that stores a plurality of screens, and a screen selection unit that selects a screen according to a combination of the speech recognized by the speech recognition unit and the operating status of the machine tool determined by the status determination unit from among the plurality of screens stored in the storage unit, and causes the display unit to display the selected screen.

DESCRIPTION OF EMBODIMENTS

Hereinafter, a machine tool 1 according to an embodiment will be described with reference to the drawings.

Figure 1:
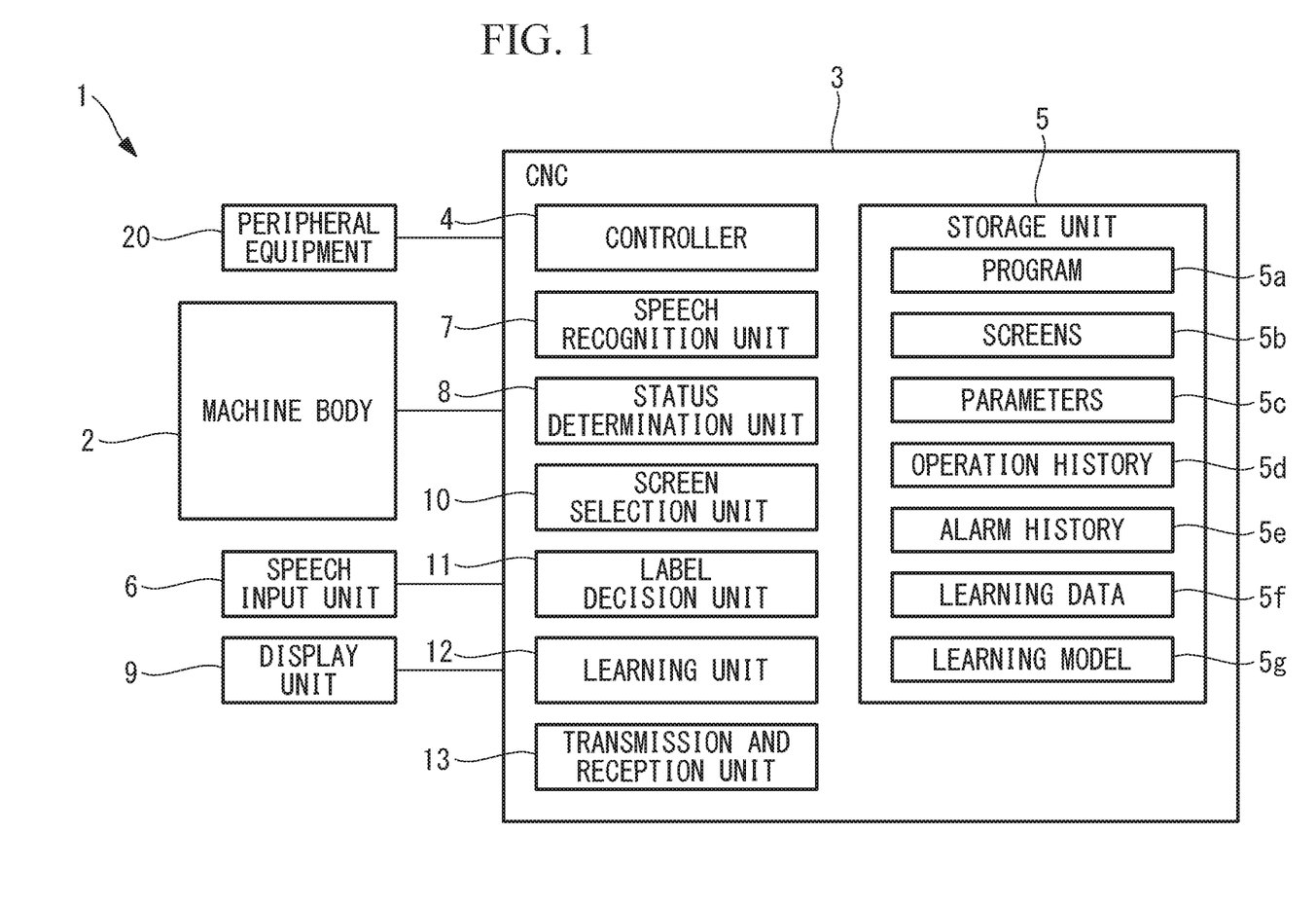
FIG. 1 is a block diagram of a machine tool according to an embodiment.

As illustrated in FIG. 1, the machine tool 1 includes a machine body 2 that processes a workpiece, and a computer numerical control (CNC) device 3 that controls the machine body 2.

For example, the machine body 2 includes a table on which the workpiece is secured by a jig, a turret that holds a plurality of tools, and a spindle that alternatively holds the plurality of tools. The machine body 2 processes the workpiece with rotating tools by causing the table and the spindle to move relative to each other. Also, the machine body 2 includes a function of automatically exchanging tools between the spindle and the turret.

The CNC 3 includes a controller 4 that includes a processor, and a storage unit 5 that includes non-volatile storage, ROM, RAM, and the like. In the storage unit 5, a machining program 5a for controlling the motion of the machine body 2 is stored. The controller 4 transmits control commands to the machine body 2 in accordance with the machining program 5a, and thereby causes the machine body 2 to execute motions based on the machining program 5a, such as processing the workpiece with tools and exchanging tools.

Also, the storage unit 5 stores a large number of screens 5b by which an operator sets up the machine tool 1 and operates the machine tool 1.

The machine tool 1 additionally includes a speech input unit 6 that accepts the operator's speech as input, a speech recognition unit 7 that recognizes speech input into the speech input unit 6, a status determination unit 8 that determines the operating status of the machine tool 1, a display unit 9, a screen selection unit 10 that selects a screen to be displayed on the display unit 9 on the basis of a combination of the speech and the operating status, a label decision unit 11 that decides a label expressing whether or not the selected screen is correct, and a learning unit 12 that learns correspondence relationships between the combination of the speech and the operating status, and the selected screen on the basis of a label.

The speech input unit 6 and the display unit 9 are provided on a front face of a box-shaped cover that covers the machine body 2, for example.

The speech recognition unit 7, the status determination unit 8, the screen selection unit 10, the label decision unit 11, and the learning unit 12 are provided in the CNC 3. The speech recognition unit 7, the status determination unit 8, the screen selection unit 10, the label decision unit 11, and the learning unit 12 may also be provided in an information processing device that is connected to the CNC 3 and capable of communicating with the CNC 3. Each of the speech recognition unit 7, the status determination unit 8, the screen selection unit 10, the label decision unit 11, and the learning unit 12 includes a processor, and the processes described later are executed by a processor. The learning unit 12 may also be a learning program stored in the storage unit 5, and the functions of the learning unit 12 may be achieved by having the controller 4 perform learning in accordance with the learning program.

The speech input unit 6 includes a microphone, for example. Speech data input into the speech input unit 6 is transmitted to the speech recognition unit 7.

The display unit 9 functions as a user interface through which the operator sets up and operates the machine tool 1. For example, the display unit 9 includes a touch panel that displays screens. By performing touch operations on the touch panel, the operator is able to perform input operations on a displayed screen and also cause screen transitions.

The speech recognition unit 7 analyzes the speech data from the speech input unit 6 and recognizes words spoken by the operator. For example, the speech recognition unit 7 converts the speech data into a character string and recognizes the speech as a character string.

The status determination unit 8 determines the operating status of the machine tool 1 when speech is input into the speech input unit 6. For example, the status determination unit 8 acquires at least one of machine operating state data, peripheral equipment data, and history data, and determines the operating status on the basis of the acquired data.

The machine operating state data is data related to the current state of the machine body 2, and includes at least one of the machining program 5*a* and parameters 5*c* stored in the storage unit 5. The machine operating state data may also include a ladder program for the peripheral equipment 20. The parameters 5*c* include setup parameters set by the operator with regard to the machine body 2 and the peripheral equipment 20, state parameters expressing the current state of the machine body 2, such as the positions of a stage and the spindle, and various other parameters.

The peripheral equipment data includes data expressing the connection status between the machine tool 1 and the peripheral equipment 20. The peripheral equipment 20 is attached to the machine body 2 or disposed near the machine body 2. The peripheral equipment 20 may be equipment that cooperates with the machine tool 1 or equipment that works independently from the machine tool 1. For example, the peripheral equipment 20 is a chip conveyor, a mist eater, a robot that attaches the workpiece to the table and detaches the workpiece from the table, and an additional axis table installed on the table. The peripheral equipment 20 is connected to the CNC 3.

The history data includes an operation history 5*d* and an alarm history 5*e* stored in the storage unit 5. The operation history 5*d* is a history of operations by the operator with respect to the display unit 9. The alarm history 5*e* is a history of alarms emitted by the CNC 3.

On the basis of a learning model 5*g* stored in the storage unit 5, the screen selection unit 10 selects a screen corresponding to the combination of the operator's speech recognized by the speech recognition unit 7 and the operating status of the machine tool 1 determined by the status determination unit 8 from among the large number of screens 5*b* in the storage unit 5. The screen selection unit 10 transmits the selected screen to the display unit 9, and causes the display unit 9 to display the selected screen.

The label decision unit 11 decides a label indicating whether or not the screen selected by the screen selection unit 10 and displayed on the display unit 9 is the correct screen desired by the operator.

On the basis of the label decided by the label decision unit 11, correct data is stored as learning data 5*f* in the storage unit 5. The correct data contains the set of the operating status of the machine tool 1, speech, and the correct screen. By adding new correct data every time a correct screen is displayed on the display unit 9 in response to the operator' speech, the correct data is accumulated. In addition to the correct data, incorrect data may also be stored in the storage unit 5. The incorrect data contains the set of the operating status of the machine tool 1, speech, and an incorrect screen.

For example, the label decision unit 11 determines whether the selected screen is correct or incorrect on the basis of an operation performed by the operator after the selected screen is displayed on the display unit 9.

In the case where the selected screen is correct, the operator will normally perform an input operation on the selected screen, such as pressing a button, selecting from a menu, or inputting a numerical value. Consequently, in the case where an input operation is performed on the selected screen without transitioning to another screen after the selected screen is displayed on the display unit 9, the label decision unit 11 determines that the selected screen is correct.

On the other hand, in the case where the selected screen is incorrect, the operator will normally transition to another screen without performing an input operation on the selected screen. Consequently, in the case where a transition to another screen is performed without performing an input operation on the selected screen after the selected screen is displayed on the display unit 9, the label decision unit 11 determines that the selected screen is incorrect.

By learning correspondence relationships between combinations of speech and the operating status of the machine tool 1, and correct screens on the basis of the correct data stored in the storage unit 5, the learning unit 12 creates a learning model 5*g* indicating correspondence relationships between the combinations of speech and the operating status, and the screens.

Correct data prepared as initial learning data may also be pre-stored in the storage unit 5. In this case, the learning unit 12 creates the learning model 5*g* by learning using the initial learning data. After that, new correct data is added to the initial learning data every time a correct screen is displayed on the display unit 9 in response to the operator's speech. By performing additional learning using the initial learning data and the added correct data, the learning unit 12 continually updates the learning model 5*g*.

Next, an operation of the machine tool 1 will be described.

When the operator wants to cause a desired screen to be displayed on the display unit 9, the operator speaks a word or phrase related to the desired screen. The word or phrase spoken by the operator is sent to the speech recognition unit 7 through the speech input unit 6, and is recognized by the speech recognition unit 7. Also, the operating status of the machine tool 1 when the operator speaks the word or phrase is determined by the status determination unit 8.

Next, a screen corresponding to the combination of the operator's speech and the operating status of the machine tool 1 is selected on the basis of the learning model 5*g* by the screen selection unit 10 from among the large number of screens 5*b* in the storage unit 5, and the selected screen is displayed on the display unit 9.

In one example, the status determination unit 8 determines the operating status on the basis of the combination of the machine operating state data and the history data. The history data may express operations by the operator, motions by the machine tool 1, and characteristics or trends of the workpiece or the like so far. Consequently, the operating status can be determined more accurately on the basis of the combination of the machine operating state data and the history data.

In another example, the status determination unit 8 determines the operating status on the basis of the combination of the machine operating state data and the peripheral equipment data. In the case where the peripheral equipment 20 that cooperates with the machine tool 1 is connected to the CNC 3, screens for setting up and operating the peripheral equipment 20 are added. Particularly, in the case of a robot, the setup is complex, and therefore many screens are added. In such a case, the appropriate screen can be selected by using the peripheral equipment data as an additional basis for judgment as well.

Causing the display unit 9 to display a desired screen by performing on operation on the display unit 9 may require a large number of screen transitions in some cases. Consequently, an inexperienced operator may have difficulty reaching the desired screen. According to the present embodiment, even an inexperienced operator is able to cause the display unit 9 to display a desired screen by simply speaking a word or phrase related to the desired screen. In this case, by considering the operating status of the machine tool 1 in addition to the operator's speech, the screen desired by the operator can be selected correctly. For example, even in the case where the many screens 5*b* stored in the storage unit 5 include a plurality of similar screens or a plurality of screens corresponding to the same speech, the screen desired by the operator can be determined correctly, and the display unit 9 can be made to display an appropriate screen.

It is also difficult for the operator to memorize the names of each of the many screens 5*b*. According to the present embodiment, a screen corresponding to the combination of the speech and the operating status is learned by the learning unit 12. In other words, any word or phrase spoken by the operator is associated with the desired screen through learning. Consequently, the operator is able to cause the desired screen to be displayed with an ambiguous word or phrase rather than a predetermined word or phrase such as the name of the screen, and ease-of-use can be improved. For example, when the operator wants to set the weight of a tool after exchanging tools in the turret, the operator can cause the display unit 9 to display a screen for setting the weight of the tool with speech such as "screen for setting tool weight", "tool weight screen", "the one that comes up when the tool is changed", or "the usual".

After the selected screen is displayed on the display unit 9, in the case where the selected screen is the desired screen, the operator will normally perform an input operation on the selected screen.

On the other hand, in the case where the selected screen is not the desired screen, the operator will normally transition from the selected screen to the desired screen, and then perform an input operation on the desired screen. Consequently, after determining that the selected screen is incorrect, the label decision unit 11 may specify the screen after the transition on which the input operation is performed as the correct screen, and add the combination of the speech, the operating status, and the screen specified as correct to the correct data.

Figure 2:
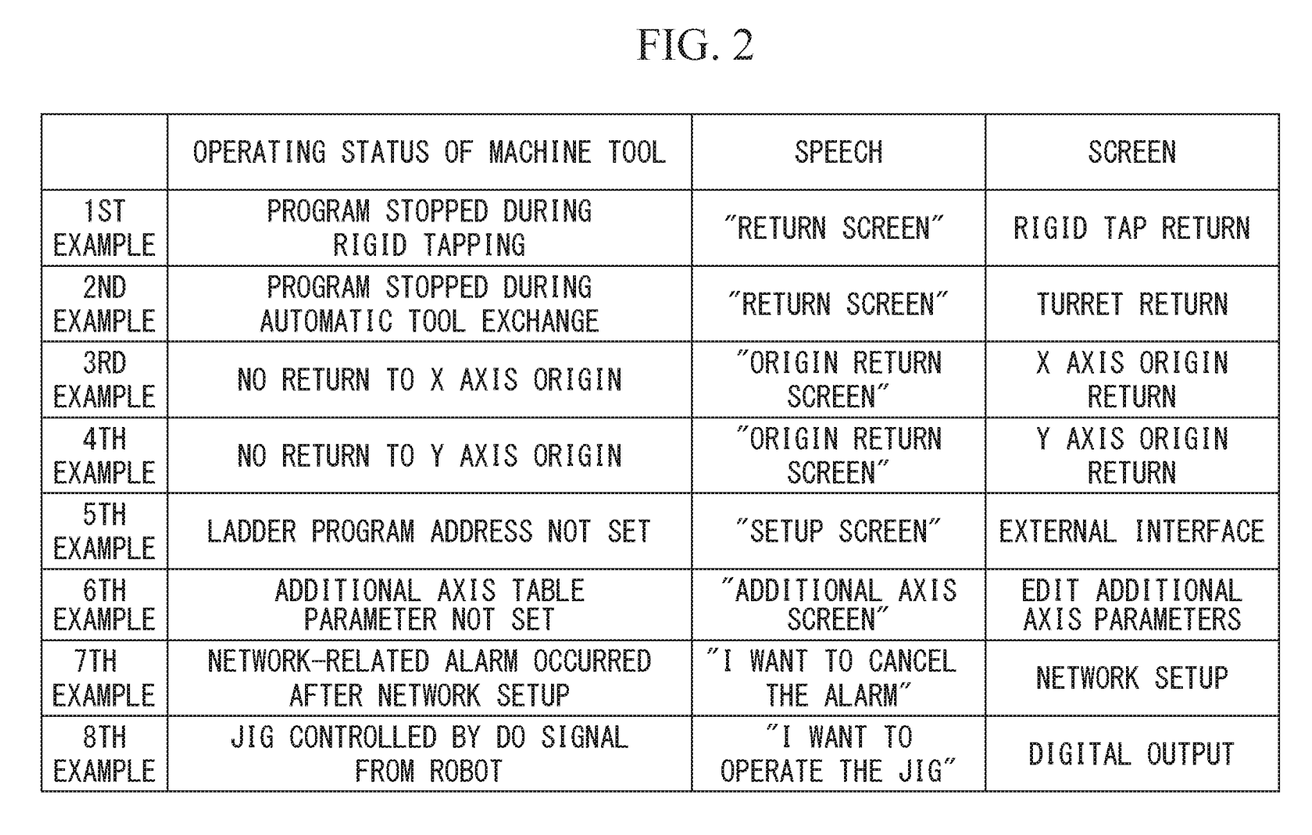
FIG. 2 is a table illustrating an example of screens selected according to the operating status of the machine tool, the operator's speech, and the screen selection unit.

FIG. 2 illustrates an example of screens selected according to the operating status of the machine tool 1, the operator's speech input into the speech input unit 6, and the screen selection unit 10.

In a first example, the operating status of the machine tool 1 is a status in which the machining program 5*a* has stopped during rigid tapping of the workpiece by a tap held on the spindle, such as an emergency stop by the operator, for example. In this status, the table and the spindle are stopped in a state with the tap screwed into the workpiece. To cause the tap to pull free of the workpiece while spinning in reverse and return the spindle to the origin position, the operator says, "return screen".

The status determination unit 8 determines the above operating status on the basis of information such as the progress of the machining program 5*a* by the controller 4, parameters expressing the current positions of the spindle and the table, and the pressing of an emergency stop button, for example. The screen selection unit 10 selects a "rigid tap return" screen on the basis of the combination of the operating status and the speech "return screen". The operator is able to cause the tap to pull free of the workpiece while spinning in reverse by performing an operation on the "rigid tap return" screen displayed on the display unit 9.

In a second example, the operating status of the machine tool 1 is a status in which the machining program 5*a* has stopped during an automatic exchange of tools between the spindle and the turret, such as an emergency stop by the operator, for example. During tool exchange, the turret and the spindle are each disposed at a tool exchange position. To cause the turret to return to the origin position, the operator says, "return screen".

The status determination unit 8 determines the above operating status on the basis of information such as the progress of the machining program 5*a* by the controller 4, parameters indicating the current positions of the turret and the spindle, and the pressing of the emergency stop button, for example. The screen selection unit 10 selects a "turret return" screen on the basis of the combination of the operating status and the speech "return screen". The operator is able to cause the turret to return to the origin position by performing an operation on the "turret return" screen displayed on the display unit 9.

In the first and second examples, the operator's speech is the same, but because the operating status is different, the screens displayed on the display unit 9 are different. In this way, by considering the operating status in addition to the speech, the screen desired by the operator can be determined correctly, and the display unit 9 can be made to display an appropriate screen.

In a third example, the operating status of the machine tool 1 is a status in which the table has not returned to the origin position on the X axis. To cause the table to return to the origin position on the X axis, the operator says, "origin return screen".

The status determination unit 8 determines the above operating status on the basis of information such as the progress of the machining program 5*a* by the controller 4 and parameters indicating the current position of the table, for example. The screen selection unit 10 selects an "origin return" screen for the X axis on the basis of the combination of the operating status and the speech "origin return screen". The operator is able to cause the table to return to the origin position on the X axis by performing an operation on the "origin return" screen for the X axis displayed on the display unit 9.

In a fourth example, the operating status of the machine tool 1 is a status in which the table has not returned to the origin position on the Y axis. To cause the table to return to the origin position on the Y axis, the operator says, "origin return screen".

The status determination unit 8 determines the above operating status on the basis of information such as the progress of the machining program 5*a* by the controller 4 and parameters indicating the current position of the table, for example. The screen selection unit 10 selects an "origin return" screen for the Y axis on the basis of the combination of the operating status and the speech "origin return screen". The operator is able to cause the table to return to the origin position on the Y axis by performing an operation on the "origin return" screen for the Y axis displayed on the display unit 9.

In the third and fourth examples, the operator's speech is the same, but because the operating status is different, the screens displayed on the display unit 9 are different. In this way, by considering the operating status in addition to the speech, the screen desired by the operator can be determined correctly, and the display unit 9 can be made to display an appropriate screen.

In a fifth example, the operating status of the machine tool 1 is a status in which an X address and a Y address of a ladder program created by the operator have not been set. The ladder program is for monitoring and controlling the peripheral equipment 20, in which the X address corresponds to an input signal from the peripheral equipment 20 and the Y address corresponds to an output signal. To set the X address and the Y address, the operator says, "setup screen".

The status determination unit 8 determines the above operating status on the basis of the ladder program and addresses (parameters) stored in the storage unit 5, for example. The screen selection unit 10 selects an "external interface" screen on the basis of the combination of the operating status and the speech "setup screen". The operator is able to set the X address and the Y address of the ladder program by performing an operation on the "external interface" screen displayed on the display unit 9.

In a sixth example, the operating status of the machine tool 1 is a status in which parameters related to an additional axis table installed on the table have not been set. To set the parameters of the additional axis table, the operator says, "additional axis screen".

The status determination unit 8 determines the above operating status on the basis of the connection status of the additional axis table to the CNC 3 and parameters related to the additional axis table, for example. The screen selection unit 10 selects an "edit parameters" screen for setting the additional axis parameters on the basis of the combination of the operating status and the speech "additional axis screen". The operator is able to set the parameters of the additional axis table by performing an operation on the "edit parameters" screen displayed on the display unit 9.

In a seventh example, the operating status of the machine tool 1 is a status in which a network-related alarm occurs when rebooting after performing an operation on a network setup screen to set an IP address or the like. The operator says, "I want to cancel the alarm".

The status determination unit 8 determines the above operating status on the basis of the state in which the alarm is occurring and the operation history 5d stored in the storage unit 5, for example. The screen selection unit 10 selects a "network setup" screen on the basis of the combination of the operating status and the speech "I want to cancel the alarm". The operator is able to correct the setting of the IP address or the like and cancel the alarm by performing an operation on the "network setup" screen displayed on the display unit 9.

In an eighth example, the operating status of the machine tool 1 is a status in which the clamping and unclamping of the jig of the machine body 2 is being controlled by a digital output (DO) signal from a control device of a robot that works in coordination with the machine tool 1. To switch the control of the jig by the DO signal to manual operation through a teach pendant of the robot, the operator says, "I want to operate the jig".

The status determination unit 8 determines the above operating status on the basis of information such as the machining program 5a being executed by the controller 4 and the connection status of the robot to the CNC 3, for example. The screen selection unit 10 selects a "digital output" screen on the basis of the combination of the operating status and the speech "I want to operate the jig", and transmits a command causing the "digital output" screen to be displayed to the control device of the robot through a communication network or the like. The control device of the robot causes the "digital output" screen to be displayed on the teach pendant in response to the command. The operator is able to switch from control by the DO signal to manual operation through the teach pendant by performing an operation on the "digital output" screen displayed on the teach pendant.

In this way, the screen selection unit 10 may also select a screen to be displayed on a display unit of the peripheral equipment 20.

In the embodiment, the screen selection unit 10 may also select a plurality of screens according to the combination of the speech and the operating status as candidates, and cause the display unit 9 to display the screens in order of highest priority. In this case, the screen selection unit 10 may respond to speech such as "no" or "next" from the operator, and cause the next screen to be displayed.

For example, the priority is set on the basis of operations by the operator after the screen is displayed in response to speech.

For example, in the case of the fifth example, the priority is set on the basis of an operation by the operator after the "external interface" screen is displayed. In the case where the operator performs an input operation on the "external interface" screen, the priority of the "external interface" screen is set to first. On the other hand, in the case where the operator causes a transition from the "external interface" screen to an "edit ladder program" screen and performs an input operation on the "edit ladder program" screen, the priority of the "edit ladder program" screen is set to first, and the priority of the "external interface" screen is set to second.

In the embodiment, the machine tool 1 may not include the label decision unit 11 and the learning unit 12. In this case, the learning model 5g obtained by learning using a large amount of learning data may also be stored in the storage unit 5.

In the embodiment, the machine tool 1 may also include a transmission and reception unit (output unit) 13 that outputs the result of learning by the learning unit 12, namely the learning model 5g, and transmit the learning model 5g from the transmission and reception unit 13 to another machine tool that does not have a learning unit. With this arrangement, even the other machine tool that does not have a learning unit can be made to select and display an optimal screen according to the combination of speech and the operating status on the basis of the learning model 5g.

Figure 3:
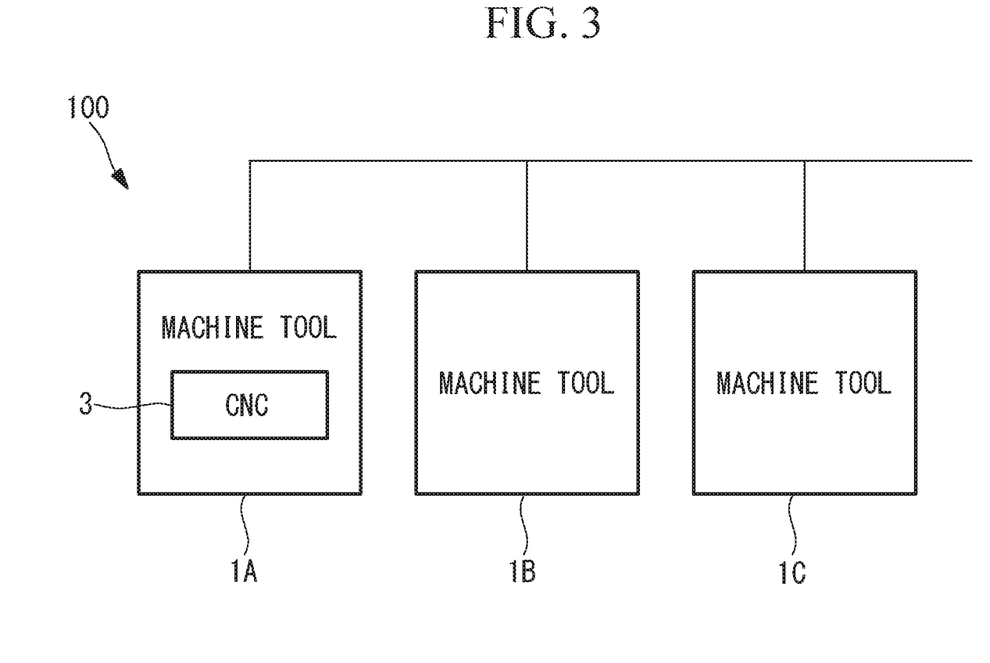
FIG. 3 is a block diagram of a management system according to another embodiment.
Figure 4:
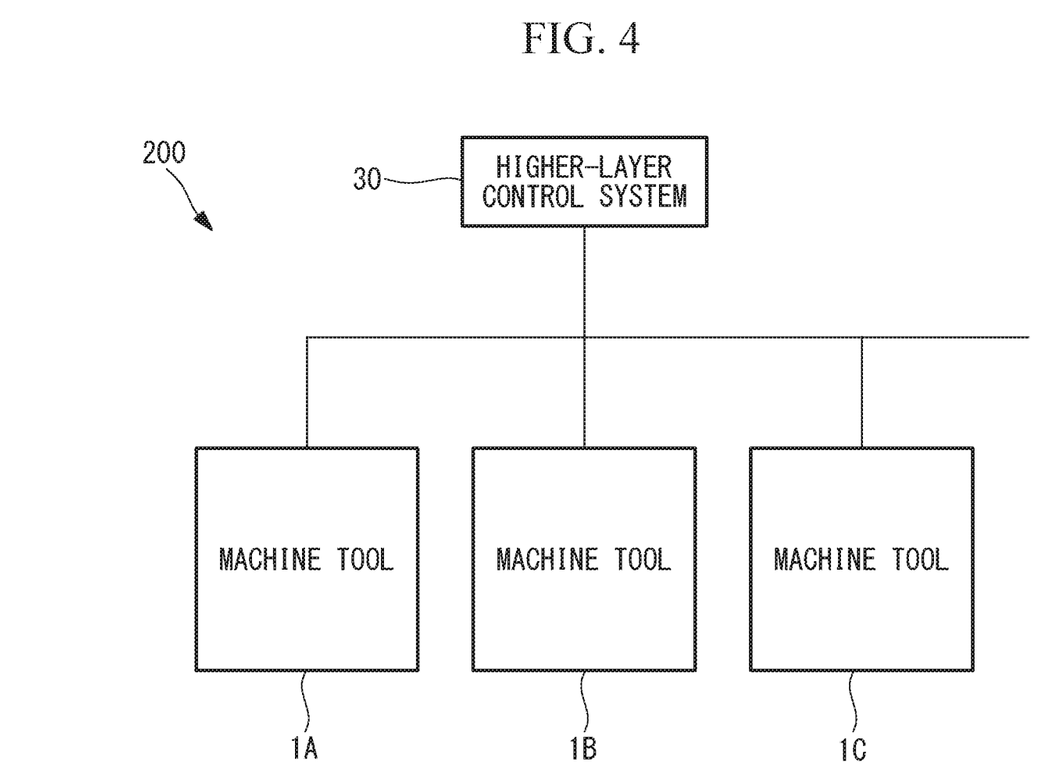
FIG. 4 is a block diagram of a management system according to another embodiment.

In the embodiment, the learning unit 12 is described as learning using learning data collected by a single machine tool 1, but instead, the learning unit 12 may also learn by using learning data collected by a plurality of machine tools 1. FIGS. 3 and 4 illustrate respective management systems 100 and 200 according to another embodiment.

The management system 100 illustrated in FIG. 3 includes a plurality of machine tools 1A, 1B, and 1C. A CNC 3 (control device) of the machine tool 1A is connected to the other machine tools 1B and 1C, and receives learning data from the other machine tools 1B and 1C. A learning unit 12 of the machine tool 1A learns using the learning data of the machine tools 1A, 1B, and 1C, and outputs a learning model from a transmission and reception unit 13. The machine tools 1B and 1C receive the learning model from the machine tool 1A with the transmission and reception unit (input unit) 13. In the case where the other machine tools 1B and 1C include the learning unit 12, the other machine tools 1B and 1C may update the received learning model with additional learning, and select a screen on the basis of the updated learning model.

The management system 200 illustrated in FIG. 4 includes a plurality of machine tools 1A, 1B, and 1C, and a higher-layer control system (control device) 30. In the management system 200, the machine tools 1A, 1B, and 1C are edge devices, and the higher-layer control system 30 is connected to the plurality of machine tools 1A, 1B, and 1C.

Examples of the higher-layer control system include systems such as a production management system, a delivery management system, a robot management system, and a department management system. The higher-layer control system includes a controller including a processor or the like, a display device, a storage unit including components such as non-volatile storage, ROM, and RAM, an input device such as a keyboard, a touch panel, and a control panel, and the like. The higher-layer control system may also be a cloud server.

The higher-layer control system 30 includes a learning unit 12 and a transmission and reception unit 13. The higher-layer control system 30 receives learning data from the plurality of machine tools 1A, 1B, and 1C, accumulates the learning data in the storage unit, and aggregates the accumulated learning data. Each of the machine tools 1A, 1B, and 1C included in the management system 200 may include the learning unit 12, but may not include the learning unit 12. The higher-layer control system 30 may create a learning model by learning using the aggregated learning data, and transmit the learning model to each of the machine tools 1A, 1B, and 1C.

Bias may occur in learning data accumulated in a single machine tool 1. For example, because each operator uses different words or phrases for calling up screens, the learning data is easily influenced by the tendency of the operator. A learning model obtained from biased learning data is not necessarily suited to other operators. By using the learning data aggregated from the plurality of machine tools 1A, 1B, and 1C, a more versatile learning model can be created.

The invention claimed is:

1. A machine tool comprising:
a speech input unit that accepts speech from an operator as speech input;
a speech recognition unit that recognizes the speech input into the speech input unit;
a status determination unit that determines an operating status of the machine tool when the speech is input into the speech input unit;
a display unit;
a storage unit that stores a plurality of screens;
a screen selection unit that selects a screen according to a combination of the speech recognized by the speech recognition unit and the operating status of the machine tool determined by the status determination unit from among the plurality of screens stored in the storage unit and causes the display unit to display the selected screen;
a label decision unit that decides a label indicating whether or not the screen selected by the screen selection unit is a correct screen desired by the operator; and
a learning unit that learns a correspondence relationship between the combination of the speech and the operating status, and the screen, on a basis of the speech recognized by the speech recognition unit, the operating status determined by the status determination unit, and the label decided by the label decision unit.

2. The machine tool according to claim 1, wherein the status determination unit determines the operating status on a basis of at least one of machine operating state data, peripheral equipment data, and history data, the machine operating state data includes at least one of a machining program and a parameter stored in the storage unit, the peripheral equipment data includes a connection status of peripheral equipment to the machine tool, and the history data includes at least one of a history of operations by the operator and an alarm history stored in the storage unit.

3. The machine tool according to claim 2, wherein the status determination unit determines the operating status on a basis of the machine operating state data and the history data.

4. The machine tool according to claim 2, wherein the status determination unit determines the operating status on a basis of the machine operating state data and the peripheral equipment data.

5. The machine tool according to claim 4, wherein the peripheral equipment includes a robot that works in coordination with the machine tool.

6. The machine tool according to claim 1, further comprising:
an output unit that outputs a result of learning by the learning unit.

7. The machine tool according to claim 6, wherein the output unit outputs the result of learning to another machine tool.

8. The machine tool according to claim 6, wherein the output unit outputs the result of learning to a higher-layer control system.

9. A management system comprising:
a machine tool; and
a control device, the machine tool comprising
a speech input unit that accepts speech from an operator as input,
a speech recognition unit that recognizes the speech input into the speech input unit,
a status determination unit that determines an operating status of the machine tool
when the speech is input into the speech input unit,
a display unit,
a storage unit that stores a plurality of screens,
a screen selection unit that selects a screen according to a combination of the speech recognized by the speech recognition unit and the operating status of the machine tool determined by the status determination unit from among the plurality of screens stored in the storage unit, and causes the display unit to display the selected screen,
a label decision unit that decides a label indicating whether or not the screen selected by the screen selection unit is a correct screen desired by the operator, and
an output unit that outputs the speech recognized by the speech recognition unit, the operating status determined by the status determination unit, and the label decided by the label decision unit as learning data, and the control device includes
an input unit that receives the learning data from the output unit of the machine tool, and
a learning unit that learns a correspondence relationship between the combination of the speech and the operating status, and the screen, on a basis of the learning data.

10. The management system according to claim 9, wherein a plurality of machine tools are provided, and the control device is a computer numerical control device of any of the plurality of machine tools, and transmits a result of learning by the learning unit to another machine tool.

11. The management system according to claim 9, wherein a plurality of machine tools and a higher-layer control system connected to the plurality of machine tools are provided, and the control device is the higher-layer control system, and transmits a result of learning by the learning unit to each of the plurality of machine tools.

* * * * *